US007364425B2

United States Patent
Fairy (10) Patent No.: US 7,364,425 B2
(45) Date of Patent: Apr. 29, 2008

(54) VALVE-GATED INJECTION MOLDING NOZZLE HAVING AN ANNULAR FLOW

(75) Inventor: Fabrice Fairy, Georgetown (CA)

(73) Assignee: Mold-Masters (2007) Limited, Georgetown, Ontario (CA)

(*) Notice: Subject to any disclaimer, the term of this patent is extended or adjusted under 35 U.S.C. 154(b) by 378 days.

(21) Appl. No.: 11/142,915

(22) Filed: Jun. 2, 2005

(65) Prior Publication Data

US 2006/0018993 A1 Jan. 26, 2006

Related U.S. Application Data

(60) Provisional application No. 60/575,842, filed on Jun. 2, 2004.

(51) Int. Cl.
*B29C 45/23* (2006.01)

(52) U.S. Cl. .......................... 425/564; 425/566

(58) Field of Classification Search ................ 425/562, 425/563, 564, 565, 566
See application file for complete search history.

(56) References Cited

U.S. PATENT DOCUMENTS

| | | | |
|---|---|---|---|
| 3,915,358 A | 10/1975 | Hehl | |
| 4,212,625 A * | 7/1980 | Shutt | .......................... 425/549 |
| 4,303,382 A | 12/1981 | Gellert | |
| 4,501,550 A | 2/1985 | Nikkuni | |
| 4,711,602 A | 12/1987 | Baker | |
| 4,712,990 A | 12/1987 | Kudert et al. | |
| 4,781,572 A | 11/1988 | Boring | |
| 4,787,836 A | 11/1988 | Osuna-Diaz et al. | |
| 4,965,028 A | 10/1990 | Maus et al. | |
| 5,208,052 A | 5/1993 | Schmidt et al. | |

(Continued)

FOREIGN PATENT DOCUMENTS

DE    196 08 676 C1    1/1997

(Continued)

OTHER PUBLICATIONS

Wright, Corin, "Improving Color Change in Hot Runner Molds," Plastics Machinery & Auxiliaries pp. 16-17 (Apr. 2003).

(Continued)

*Primary Examiner*—Tim Heitbrink
(74) *Attorney, Agent, or Firm*—Medler Ferro PLLC (57) ABSTRACT

A valve-gated nozzle in an injection molding machine allows for smooth, blended melt flow into a mold cavity. In one example, this is accomplished through use of a valve-gated nozzle having a nozzle body with a nozzle melt channel in fluid communication with a manifold melt channel and a nozzle tip. The nozzle tip includes a first melt channel in fluid communication with the nozzle melt channel and a plurality of release melt channels between the first melt channel and an annular melt channel. The annular melt channel is formed between a retaining device and the nozzle tip. The annular melt channel includes a decompression chamber in fluid communication with respective ones of the release melt channels and a compression chamber between the decompression chamber and a mold. A pressure difference formed between the respective release melt channels and the decompression chamber and between the decompression chamber and the compression chamber blends the molten material to even and balance flow into the mold cavity.

39 Claims, 7 Drawing Sheets

U.S. PATENT DOCUMENTS

| | | |
|---|---|---|
| 5,324,191 A | 6/1994 | Schmidt |
| 5,513,976 A | 5/1996 | McGrevy |
| 5,545,028 A | 8/1996 | Hume et al. |
| 5,716,651 A | 2/1998 | McGrevy |
| 5,840,231 A | 11/1998 | Teng |
| 5,871,786 A | 2/1999 | Hume et al. |
| 5,879,727 A | 3/1999 | Puri |
| 5,948,450 A | 9/1999 | Swenson et al. |
| 6,022,210 A | 2/2000 | Gunther |
| 6,089,468 A | 7/2000 | Bouti |
| 6,245,278 B1 | 6/2001 | Lausenhammer et al. |
| 6,273,706 B1 | 8/2001 | Gunther |
| 6,302,680 B1 | 10/2001 | Gellart et al. |
| 6,305,923 B1 | 10/2001 | Godwin et al. |
| 6,349,886 B1 | 2/2002 | Bouti |
| 6,478,567 B1 | 11/2002 | Kushnir et al. |
| 6,524,093 B2 | 2/2003 | Bouti |
| 6,609,902 B1 | 8/2003 | Blais et al. |
| 6,679,697 B2 | 1/2004 | Bouti |
| 6,769,901 B2 | 8/2004 | Babin et al. |
| 6,832,909 B2 * | 12/2004 | Bazzo et al. ............... 425/549 |
| 2002/0081348 A1 | 6/2002 | Bouti |
| 2003/0209833 A1 | 11/2003 | Bemis et al. |
| 2004/0091562 A1 | 5/2004 | Pilavdzic et al. |
| 2004/0234646 A1 | 11/2004 | Benenati |
| 2005/0140061 A1 | 6/2005 | Puniello et al. |
| 2005/0271766 A1 | 12/2005 | Fairy |
| 2007/0082083 A1 | 4/2007 | Fairy |

FOREIGN PATENT DOCUMENTS

| | | |
|---|---|---|
| DE | 195 33 231 A1 | 3/1997 |
| DE | 19730380 | 1/1999 |
| DE | 100 08 722 A1 | 8/2001 |
| DE | 10 2004 032 336 B3 | 11/2005 |
| EP | 0 546 554 | 3/1997 |
| EP | 0 962296 A2 | 1/2001 |
| EP | 0 962296 A3 | 1/2001 |
| EP | 1295693 | 3/2003 |
| JP | 04-320820 A | 11/1992 |
| JP | 2000-167883 A | 6/2006 |
| WO | WO 03/028974 A | 4/2003 |
| WO | WO 2005/090051 A1 | 9/2005 |
| WO | WO-2006/123237 | 11/2006 |

OTHER PUBLICATIONS

"HASCO Z1081/Magnetic Needle Valve Brochure", (Nov. 2005).

U.S. Appl. No. 11/065,167, filed Feb. 24, 2005, Fairy.

Ewikon Brochure, Oct. 2000.

Hasco, "Duese versuche fur Z3310/25".

Hasco, "Duese versuche fur Z3310/25", NVD BYPASS Drawings.

* cited by examiner

SECTION D-D
FIG. 5

VALVE-GATED INJECTION MOLDING NOZZLE HAVING AN ANNULAR FLOW

CROSS REFERENCE TO RELATED APPLICATIONS

This application claims benefit under 35 U.S.C. § 119(e) to U.S. Provisional Application No. 60/575,842, filed Jun. 2, 2004, which is incorporated by reference herein in its entirety.

This application is related to co-pending U.S. application Ser. No. 11/065,167, filed Feb. 24, 2005, which claims benefit under 35 U.S.C. § 119(e) to U.S. Provisional Application No. 60/575,841, filed Jun. 2, 2004 which are incorporated by reference herein in their entireties.

BACKGROUND

1. Field of the Invention

The present invention is related to a nozzle for an injection molding apparatus.

2. Related Art

Injection molding systems generally comprise an injection molding unit, an injection manifold and g one or more hot runner nozzles for receiving melt from a manifold and transferring/distributing the melt to one or more mold cavities. Hot runner systems offer the choice between thermal gating and valve gating. Valve gating is used in applications where the esthetic appearance of finished molded part is important, because it provides a better gate vestige on the part then thermal gating. One problem with valve pin gating is premature wear of the pin and the nozzle as a result of misalignment of the valve pin; this in turn may cause leakage and poor cosmetic part quality.

Certain known valve gated hot runner nozzles are not suitable when molding parts that require improved strength or higher esthetic merits. This is because the valve pin behaves as an obstruction in the flow of the melt through the nozzle and towards the mold cavity. The valve pin splits the melt flow and this creates undesirable flow lines that are visible or weakens the finished molded part. In order to utilize a runner system to make injection molded parts of various colors, a first color molten material must be flushed from the system so that a second color molten material may be run through the injection molding machine to produce parts of different color. Residue material from the first/subsequent color of the molten material conventionally causes numerous shots of injection molded products to be defective because they have an undesirable blend of two colors of molten material. It is common for a substantial number of products to be defective in this way requiring multiple injection cycles to clear the runner system before useable products are formed.

Additionally or aside from when color change may be a problem, unidirectional molecular orientation and weld/flow lines can be a potential cause for weakness in the structural integrity, dimensional accuracy, or cause unwanted birefringence of molded products.

Therefore, what is needed is a system and method that substantially reduces residue of molten material in an injection molding machine, while also providing a method that improves valve pin alignment in the nozzle and gate area. Additionally or alternatively what is needed is a system and method for eliminating or substantially reducing unidirectional molecular orientation and/or weld/flow lines in a molded product caused by the valve gating device, such as a valve pin.

SUMMARY

An embodiment of the present invention provides a nozzle for an injection molding apparatus comprising a nozzle body, a nozzle tip, a retaining device, an annular melt channel, and a valve gating element. The nozzle body has a nozzle melt channel with a longitudinal axis. The nozzle tip includes a first melt channel and a second melt channel. The first melt channel is in fluid communication with the nozzle melt channel. The first melt channel has a first melt channel longitudinal axis. The second melt channel is in fluid communication with the first melt channel and has a second melt channel longitudinal axis that is at an angle with respect to the first melt channel longitudinal axis. The retaining device positions the nozzle tip with respect to the nozzle body. The annular melt channel is formed between the nozzle tip and the retaining device. The valve gating element includes a valve pin that moves along the longitudinal axis of the nozzle body and the nozzle tip.

Another embodiment of the present invention provides a nozzle in an injection molding apparatus comprising a nozzle body, a nozzle seal, an annular melt channel, and a valve gating element. The nozzle body has a nozzle melt channel. The nozzle melt channel has a longitudinal axis. The nozzle seal includes a first piece and a second piece, the first piece being a nozzle tip and the second piece being a retaining and sealing device. The second piece includes a retaining portion that positions the nozzle tip with respect to the nozzle body and a sealing portion that insulates the nozzle tip from a mold cavity plate. The annular melt channel is formed between the first and second pieces of the nozzle seal, such that melt flows through the annular melt channel before entering the mold cavity. The valve gating element includes a valve pin that moves along the longitudinal axes of the nozzle body and a bore of the second piece of the nozzle seal to selectively open a mold gate of a mold cavity.

Another embodiment of the present invention includes one of the above nozzles incorporated into an injection molding machine.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

One or more embodiments of the present invention provide a valve-gated nozzle in an injection molding machine that allows for an improved flow of a molten material into a mold cavity, which can substantially reduce or eliminate flow lines in an injected molded product. In one example, this is accomplished through use of a valve-gated nozzle having a nozzle body with a nozzle melt channel in fluid communication with a nozzle tip, and which can also be in fluid communication with a manifold melt channel. The nozzle tip includes a first melt channel in fluid communication with the nozzle melt channel and one or more release melt channels between the first melt channel and an annular melt channel.

In one embodiment of the present invention, the annular melt channel is formed between a retaining device and the nozzle tip. The annular melt channel includes a decompression chamber in fluid communication with respective ones of the release melt channels and a compression chamber between the decompression chamber and a mold cavity. In this embodiment, a pressure difference results between the respective release melt channels and the decompression chamber and between the decompression chamber and the compression chamber that acts to blend the molten material in the nozzle tip area more quickly and efficiently than current systems, such that it enters a mold cavity without flow lines, i.e., weld lines.

In one example, the material used for the nozzle tip is a high thermally conductive material. In another example the nozzle tip has corrosion and abrasion resistance (e.g., wear resistance). A plurality of holes or bores, i.e., release or second tip melt channels, are located at a point where the nozzle tip separates from the retaining device. The holes or bores are oriented from the first tip melt channel outwardly towards the retaining device The flow rate required from the hot runner system to fill the mold cavity is used to determine the diameter and the number of the exit holes In this example, and as discussed above, the nozzle tip is designed in conjunction with the retaining device to have the annular melt channel with decompression and compression chambers. The nozzle tip holes or bores exit to the decompression chamber, which creates a circular flow of the molten material around the nozzle tip in order to mix/blend the molten material. Then, under the growing pressure of the molten material in the decompression chamber, the molten material flows through the compression chamber, which acts as a pressure regulator and shear generator. This leads to an annular flow, which flushes out and further blends the molten material to eliminate flow lines and/or ease color change.

The compression of the molten material occurs up to a seal area at a downstream portion of the retaining device and a mold gate area. As such, in the seal area a reduction of the annular surface of the nozzle tip increases the flow speed and shear rate of the melt, which can result in an increase of the relative temperature of the molten material and hot runner components (e.g., the retaining device and the nozzle tip). This facilitates the re-melting and flushing out of any solidified melt material in contact with the mold left behind from the previous shot, which reduces the number of shots required to achieve complete color change.

Also in this example, the nozzle tip acts as a guide for the valve pin in order to avoid any deflection due to pin closing and/or pressure against movement of the valve pin. By improving the valve pin alignment, less wear of the pin, nozzle, and gate area will occur, which will result in better part quality and less chance of leakage.

Overall System

Figure 1:
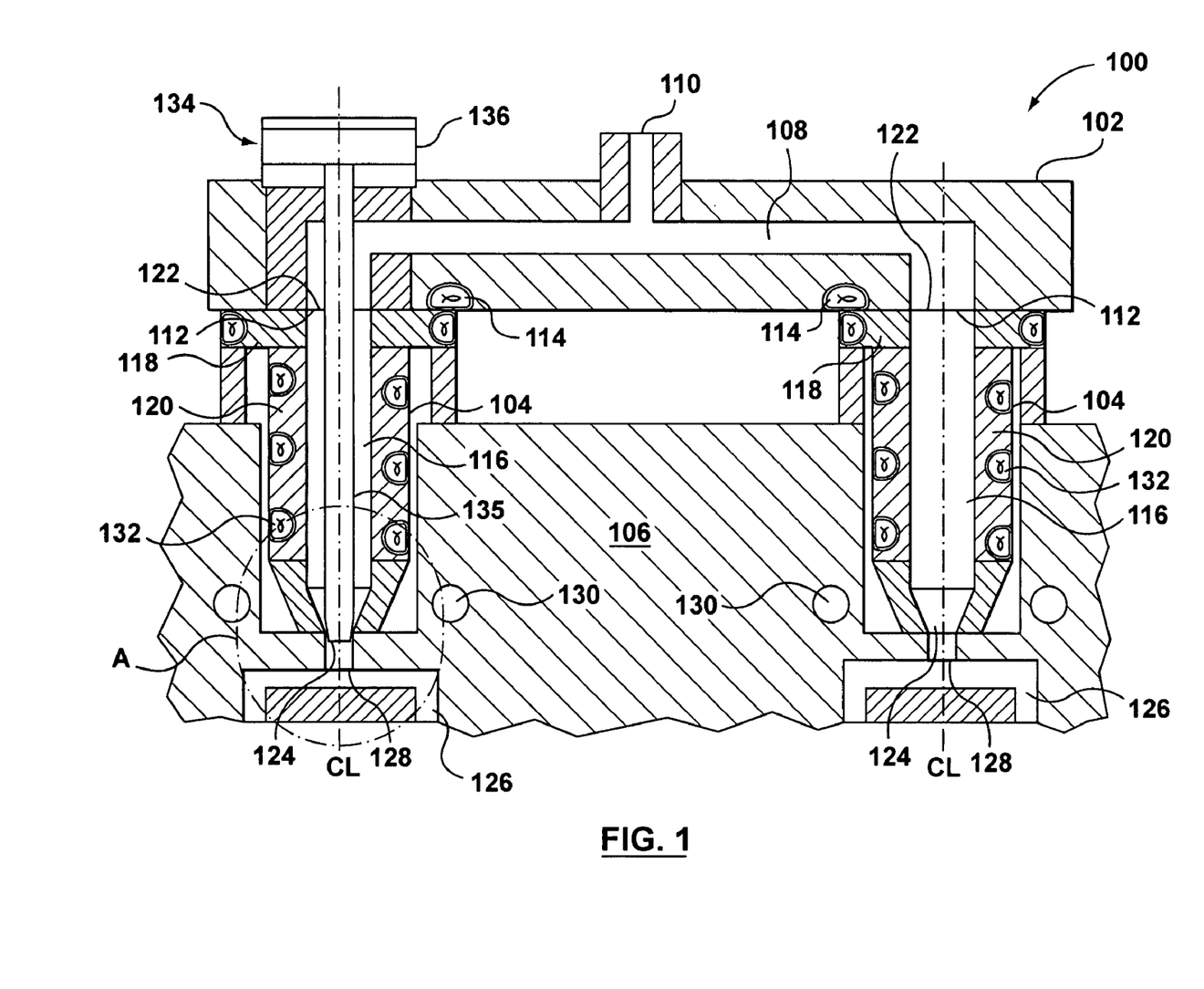
FIG. 1 illustrates a partial sectional view of an injection molding machine, in which the present invention may be utilized.

FIG. 1 shows an injection molding apparatus 100 in which the present invention may be utilized. Apparatus 100 includes a manifold 102, a plurality of nozzles 104, and a mold plate 106. Manifold 102 has a plurality of manifold melt channels 108 extending therethrough from an inlet 110 to a plurality of outlets 112. Manifold 102 includes a heater 114 for heating melt in the manifold melt channels 108.

A nozzle melt channel 116 passes through a head portion 118 and a body portion 120 of nozzle 114, extending from an inlet 122 in head portion 118 to an outlet 124 in body portion 120. Head portion 118 abuts against a downstream surface of manifold 102 so that one of manifold melt channel outlets 112 communicates with inlet 122 of nozzle melt channel 116. Nozzle melt channel 116 may be generally longitudinally centered in head and body portions 118 and 120, i.e., melt channel 116 may extend generally along axis CL.

Mold plate 106 includes a plurality of mold cavities 126 in which injection molded articles are formed. Each mold cavity 126 receives melt through a gate 128, which is in communication with outlet 124 from one of nozzles 104. Mold plate 106 may be cooled by means of a fluid flowing through a plurality of cooling channels 130, to solidify melt in mold cavities 126, thereby forming molded articles (not shown).

Each nozzle 104 includes a heater 132 that is wrapped around body portion 120.

By example in FIG. 1, one of nozzles 104 includes a valve gating element 134. Valve gating element 134 includes a valve pin 135 that is movable within nozzle melt channel 116 by means of an actuator 136. The other one of nozzles 104 is thermally gated, and thus does not include a valve pin.

In use, melt passes from a melt source (not shown), through manifold inlet 110, through manifold melt channels 108, through nozzle melt channels 116, through gate 128 and into melt cavities 126.

It will be appreciated that nozzles 104 may be used with configurations of injection molding apparatus, other than that shown in FIG. 1. For example, nozzles 104 may be used with injection molding apparatuses having a single mold cavity. Nozzles 104 may also be used with co-injection molding apparatuses that have a plurality of manifolds 102. Nozzles 104 may also be used with stack-mold machines.

First Exemplary Valve-Gated Nozzle

Figure 2:
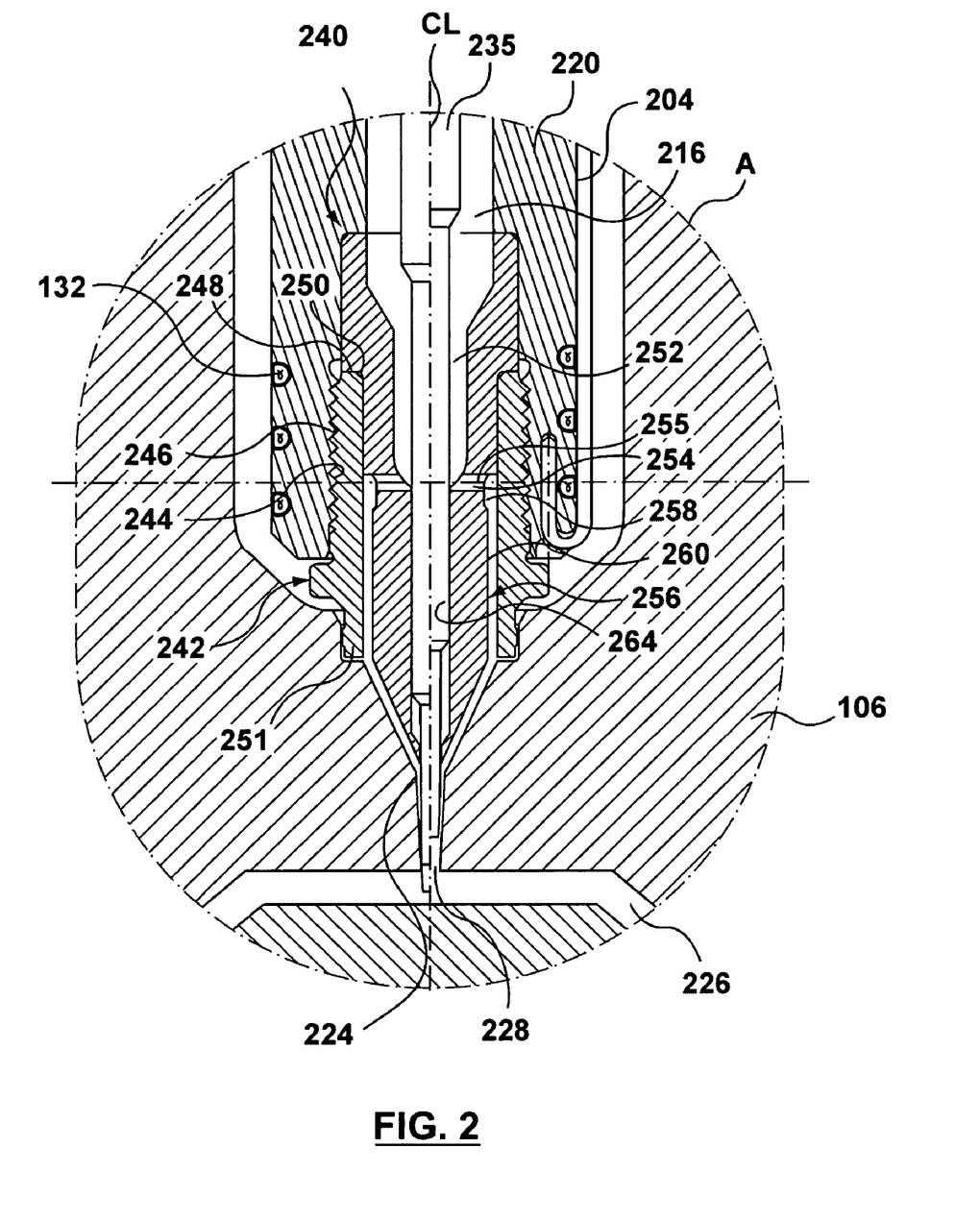
FIG. 2 shows a side sectional view of a nozzle for use in the machine of FIG. 1, according to an embodiment of the present invention.

FIG. 2 a side-sectional view of a portion of a valve-gated nozzle, according to one embodiment of the present invention, for use in the environment described in FIG. 1. In this embodiment, a valve-gated nozzle 204 includes a torpedo type nozzle tip/liner 240. Nozzle 204 also includes a retaining device 242. In one example, nozzle tip 240 and retaining device 242 function as a two-piece nozzle seal. Retaining device 242 positions nozzle tip 240 within a nozzle body 220. In this embodiment, retaining device 242 is engaged through threads (not shown) on an outer wall 244 of retaining device 242 with complementary threads (not shown) on an inner wall 246 of nozzle body 220. When engaged, a shoulder 248 of retaining device 242 abuts a curved portion 250 of nozzle tip 240 to secure it to nozzle body 220. In one example, retaining device 242 also includes a sealing portion 251. The retaining device 242 can be engaged with the nozzle body 220 by brazing, soldering, press fit, or any other acceptable known method.

In one example, sealing portion 251 functions as an insulating insert or insulating portion, and can be made from titanium, ceramic, high temperature polymer material, or the like.

In this figure, a valve pin 235 is shown in both its open (right half) and closed (left half) positions. In one example, retaining device 242 is made from a steel-based, a titanium-based, a ceramic-based, or other thermally insulative material. In one example, nozzle tip 240 is made from a copper-based, a steel-based, or other thermally conductive material. Other materials that function similarly to those described above would become apparent to one of ordinary skill in the art upon reading this description.

Nozzle tip 240 includes a first melt channel 252 having a longitudinal axis CL and is in fluid communication at an upstream end with a nozzle body melt channel 216. First melt channel 252 is in fluid communication at a downstream end with at least one second melt channel 254 having an axis 255. In one example, longitudinal axis CL of first melt channel 252 and axis 255 of the second melt channel 254 are substantially normal with respect to each other. For example, substantially normal can mean they are 90°±10°. In another example, another range is possible based on tolerances within desired applications. However, in another example the axes CL and 255 are at an angle with respect to each other, for example an acute angle.

A valve pin alignment bore 264 of nozzle tip 240 is sized to slidingly receive valve pin 235, but not the melt from first melt channel 252. Second melt channel 254 is in fluid communication with an annular melt channel 256 formed between nozzle tip 240 and retaining device 242. Annular melt channel 256 includes a first portion 258 and a second portion 260.

Second melt channel 254 is a release or exit channel through which the molten material flows from first melt channel 252 of nozzle tip 240. Second melt channel 254 can be formed as a bore or hole through a wall of nozzle tip 240. Depending on an application and/or material make-up of nozzle tip 240, there can be any number of release melt channels 254.

In the embodiment shown in FIG. 2, release melt channel 254 of nozzle tip 240 is used to transmit the molten material to first portion 258 of annular melt channel 256, which in this embodiment acts as a decompression chamber. A pressure of the molten material is greater in release melt channel 254 than in decompression chamber 258. From decompression chamber 258, the molten material flows into second portion 260, which is a compression chamber. A pressure of the molten material is in decompression chamber 258 is reduced due to the material expansion allowed within decompression chamber 258. From decompression chamber 258, the molten material flows into second portion 260 of annular melt channel 256, which in this embodiment acts as a compression chamber. Due to the restriction configuration of second portion 260, pressure of the molten material is increased as the molten material is forced through compression chamber 260 toward a mold gate 228 of a mold cavity 226. As can be appreciated from FIG. 2, in an example embodiment, the decompression chamber 258 circumferentially surrounds the portion of the nozzle tip 240 through which release melt channel 254 extends such that melt channel 254 discharges radially into the circumferential decompression chamber 258. Additionally, as can also be appreciated from FIG. 2, in an example embodiment the circumference/diameter of the nozzle tip is smaller in the area of decompression chamber 258 than the circumference/diameter of the nozzle tip in the area of compression chamber 260, such that cross-sectional flow area through the decompression chamber 258 is greater than that of the more restrictive compression chamber 260.

This arrangement of annular melt channel 256 balances the flow velocity and pressure of the melt exiting nozzle body melt channel 216 resulting in balanced melt flow between the mold cavities 226, which in turn provides consistent part quality between parts produced in different mold cavities.

In this embodiment, nozzle tip 240 is used for two purposes. One purpose, as described above, is for control of melt flow. Nozzle tip 240 distributes the molten material from first melt channel 252 through release melt channels 254, such that the flow, velocity, and/or pressure is balanced. This results in an even and balanced flow of the molten material.

Nozzle tip 240 also functions as an alignment device for valve pin 235. As such, nozzle tip 240 includes valve pin alignment bore 264 that slidingly aligns valve pin 235 with gate 228 in close proximity thereto to avoid any deflection during pin closing and pressure against movement. In one example, an inside surface of bore 264 can be coated with a coating that aides in the movement (friction) and/or alignment of valve pin 235. The coating can be, but is not limited to, a nickel-based material, or the like. The coating can also be implemented to improve the hardness of the nozzle tip 240 surface in contact with the valve pin 235.

In one example, it is to be appreciated that a fit between valve pin 235 and bore 264 does not allow melt to flow around valve pin 235.

In this embodiment, due to the "flushing" nature of the melt flow through nozzle tip 240 of nozzle 204 there is not a conventional "bubble" area between retaining device 242, nozzle tip 240, and mold gate 228. For example, a "bubble area" can be seen as a stagnant area between retaining device 242, tip 240, and mold gate 228 that fills with material during a first shot. The material remains stagnant and typically does not flush out between shots. In one example, the stagnant material can be used to provide insulation between nozzle tip 240 and a mold. Respective pressure changes in the melt between second melt channel 254 and first and second portions 258 and 260 of annular melt channel 256 causes the molten material to flow between first melt channel 252 and mold cavity 226 at a higher sheer rate than in conventional nozzles, thereby mixing and maintaining melt in a molten condition to readily exit via mold gate 228.

In one example, this allows a better consistency of molten material due to mixing before mold cavity 226, thereby reducing or eliminating weld/flow lines within the molded product.

In another example, through use of this configuration, during color change, as discussed above, the previous color molten material is flushed out of nozzle 204 substantially within very few product cycles, e.g., in approximately ¼-⅕ the number of cycles required using a conventional nozzle arrangement complete color change may be achieved.

Figure 9:
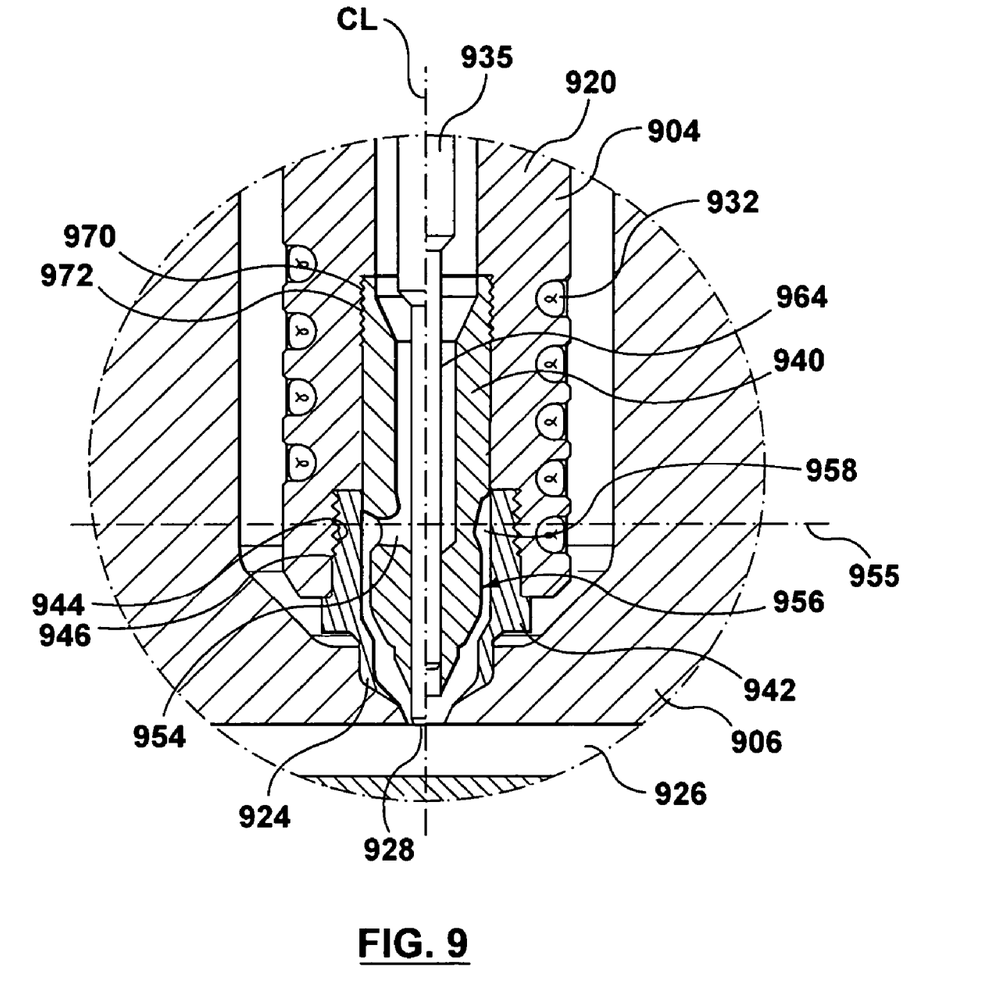
FIG. 9 shows a cross-sectional view of a portion of a nozzle, according to one embodiment of the present invention.

FIG. 9 shows a cross-sectional view of a portion of a nozzle, according to one embodiment of the present invention. All elements shown in FIG. 9 are similar to those shown in FIG. 2 and described above, except in this embodiment a shoulder 248 and a curved portion 250 of nozzle tip 240 are not used in conjunction to retain nozzle tip 940 in nozzle 904. Nozzle tip 940 is retained in nozzle 904 through use of threading engagement between threads 970 formed on nozzle tip 940 and threads 972 formed on nozzle 904. In other examples, instead of threads brazing or other coupling schemes could also be used.

Second Exemplary Valve-Gated Nozzle

Figures 3, 4, 5:
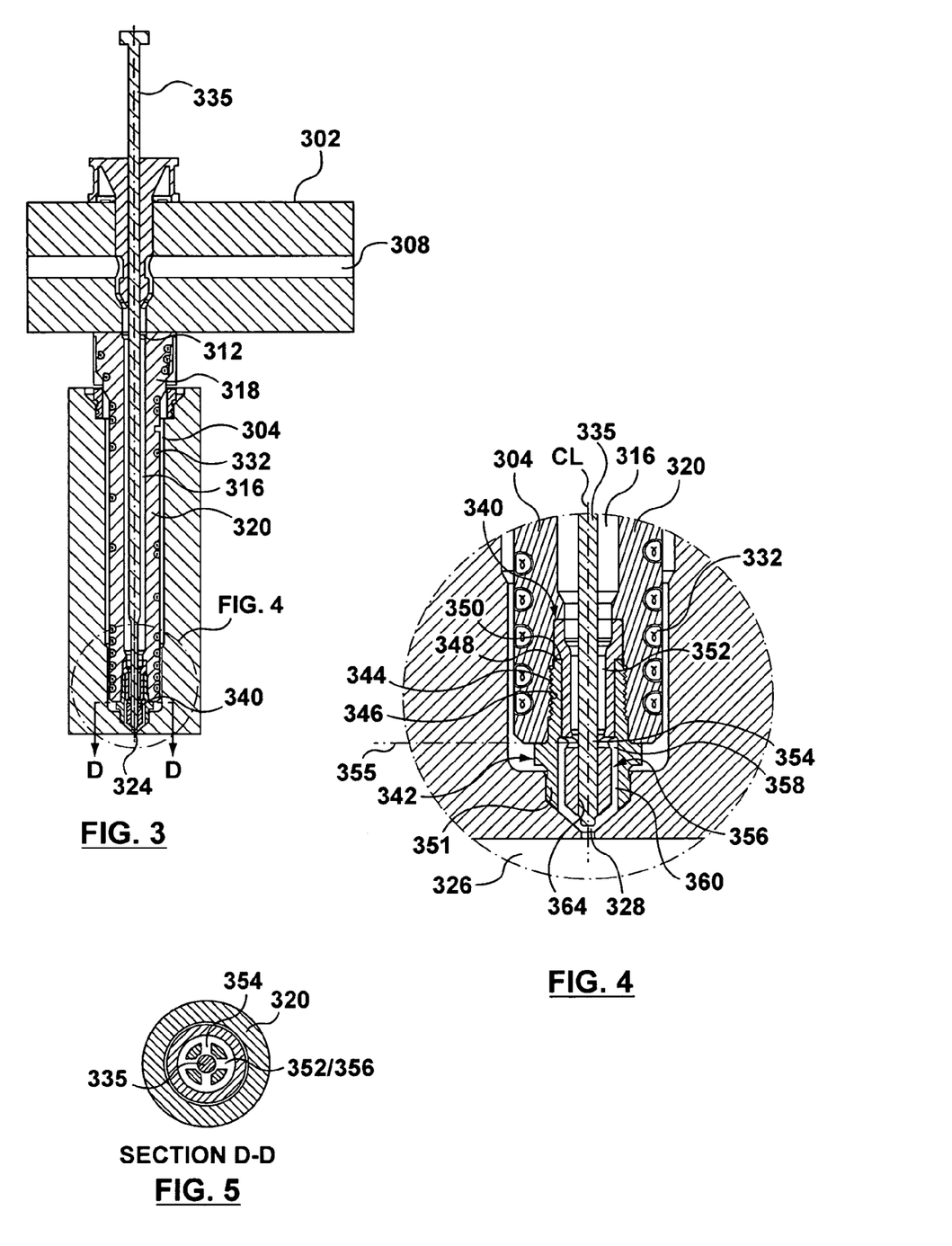
FIG. 3 shows a side sectional view of a nozzle for use in the machine of FIG. 1, according to an embodiment of the present invention.
FIG. 4 is an enlarged view of a portion of the nozzle in FIG. 3.
FIG. 5 shows a cross-sectional view of the nozzle of FIG. 3 taken along line D-D in FIG. 3, according to an embodiment of the present invention.

FIG. 3 shows a side sectional view of a nozzle for use in the machine of FIG. 1, according to an embodiment of the present invention. FIG. 4 is an enlarged view of a portion of the nozzle in FIG. 3. In this embodiment, a valve-gated nozzle 304 includes a nozzle tip/liner 340. Nozzle 304 also includes a retaining device 342. In one example, nozzle tip 340 and retaining device 342 function as a two-piece nozzle seal. Retaining device 342 positions nozzle tip 340 within a nozzle body 320. In this embodiment, retaining device 342 is threadingly engaged through threads (not shown) on an outer wall 344 of retaining device 342 with complementary threads (not shown) on an inner wall 346 of nozzle body 320. When engaged, a shoulder 348 of retaining device 342 abuts a curved portion 350 of nozzle tip 340 to secure it to nozzle body 320.

In this figure, a valve pin 335 is shown in both its open (right half) and closed (left half) positions. In one example, retaining device 342 is made from a steel-based, a titanium-based, a ceramic-based, or other thermally insulative material. In one example, nozzle tip 340 is made from a copper-based, a steel-based, or other thermally conductive material. Other materials that function similarly to those described above would become apparent to one of ordinary skill in the art upon reading this description.

Nozzle tip 340 includes a first melt channel 352 having a longitudinal axis CL and is in fluid communication at an upstream end with a nozzle body melt channel 316. First melt channel 352 is in fluid communication at a downstream end with at least one second melt channel 354 having an axis 355. In one example, longitudinal axis CL of first melt channel 352 and axis 355 of the second melt channel 354 are substantially normal with respect to each other. For example, in one example substantially normal can mean they are 90°±10°. However, in other applications with other tolerance, substantially normal can have other ranges. In another example, longitudinal axis CL and axis 355 can be at an angle with respect to each other, for example an acute angle. A valve pin alignment bore 364 is sized to slidingly receive valve pin 335, but not the melt, from first melt channel 352. Second melt channel 354 is in fluid communication with an annular melt channel 356 formed between nozzle tip 340 and retaining device 342. Annular melt channel 356 includes a first portion 358 and a second portion 360.

Second melt channel 354 is a release or exit channel through which the molten material flows from first melt channel 352 of nozzle tip 340. Second melt channel 354 can be formed as a bore or hole through a wall of nozzle tip 340. Depending on an application and/or material make-up of nozzle tip 340, there can be any number of release melt channels 354.

In the embodiment shown in FIGS. 3 and 4, release melt channel 354 of nozzle tip 340 is used to transmit the molten material to first portion 358 of annular melt channel 356, which in this embodiment acts as a decompression chamber. A pressure of the molten material is greater in release melt channel 354 than in decompression chamber 358. From decompression chamber 358, the molten material flows into second portion 360 of annular melt channel 356, which in this embodiment acts as a compression chamber. Due to the restriction configuration of second portion 360, pressure of the molten material is increased as the molten material is forced through compression chamber 360 toward a mold gate 328 of a mold cavity 326.

This arrangement of annular melt channel 356 balances the flow velocity and pressure of the melt exiting nozzle body melt channel 316 resulting in an even/balances flow out of annular melt channel 356 and into mold cavity 326.

In this embodiment, nozzle tip 340 is used for two purposes. One purpose, as described above, is for control of melt flow. Nozzle tip 340 distributes the molten material from first melt channel 352 through release melt channels 354, such that the flow, velocity, and/or pressure is balanced. This results in an even and balanced flow of the molten material. Nozzle tip 340 also functions as an alignment device for valve pin 335. As such, nozzle tip 340 includes valve pin alignment bore 364 that slidingly aligns valve pin 335 with gate 328 in close proximity thereto to avoid any deflection during pin closing and pressure against movement. In one example, an inside surface of bore 364 can be coated with a coating that aides in the movement and/or alignment of valve pin 335. The coating can be, but is not limited to, a nickel-based material, or the like.

In this embodiment, due to the "flushing" nature of the melt flow through nozzle tip area 340 of nozzle 304 there is not a conventional "bubble" area between retaining device 342, nozzle tip 340, and mold gate 328. For example, a "bubble area" can be seen as a stagnant area between retaining device 342, tip 340, and mold gate 328 that fills with material during a first shot. The material remains stagnant and typically does not flush out between shots. In one example, the stagnant material can be used to provide insulation between nozzle tip 340 and a mold. The respective pressure changes in the melt between second melt channel 354 and first and second portions 358 and 360 of annular melt channel 356 causes the molten material to flow between first melt channel 352 and mold cavity 326 at a higher sheer rate than in conventional nozzles, thereby mixing and maintaining melt in a molten condition to readily exit via mold gate 328.

In one example, this allows a better consistency of molten material due to mixing before mold cavity 326, thereby reducing or eliminating weld/flow lines within the molded product.

In another example, through use of this configuration, during color change, as discussed above, the previous color molten material is flushed out of nozzle 304 substantially within very few product cycles, e.g., 10-15 product cycles. This is substantially less than the 50-60 product cycles that customarily are required before a previous color is fully flushed out of a conventional nozzle arrangement.

Figure 7:
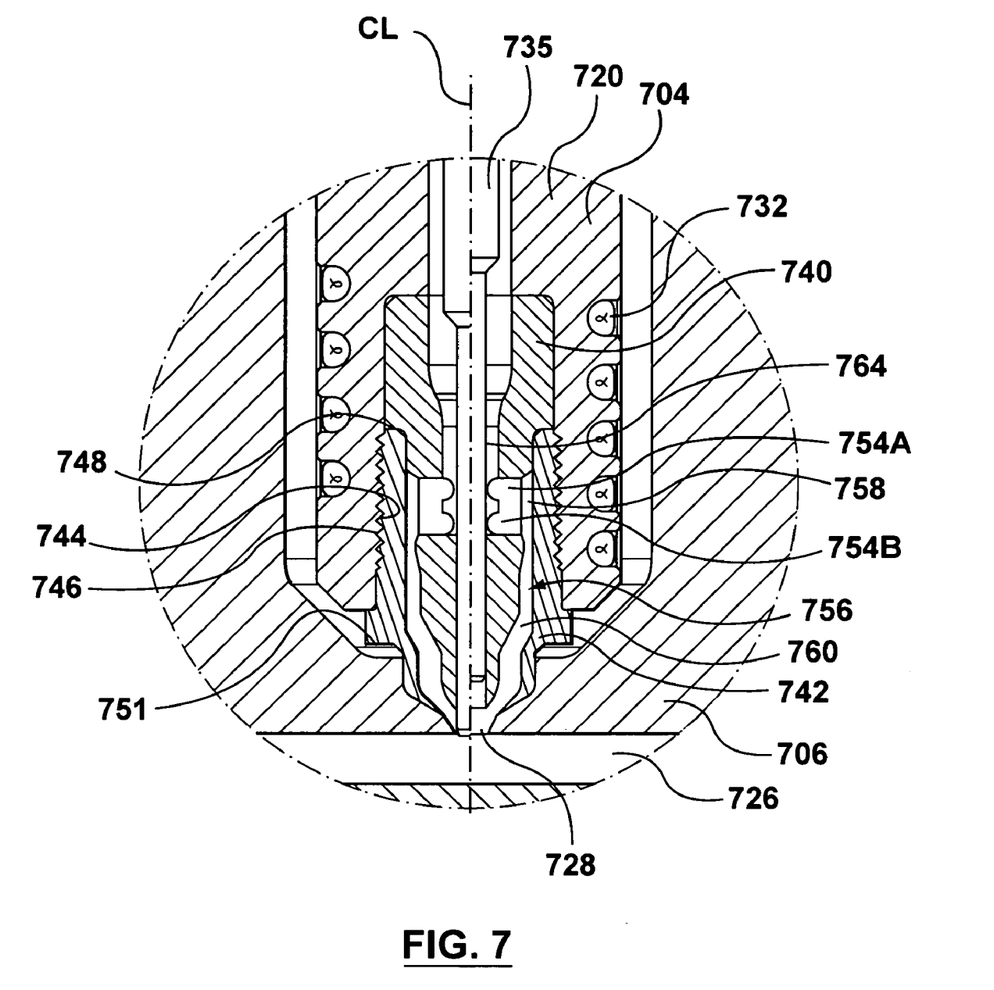
FIGS. 7 and 8 show a cross-sectional view (taken along line E-E in FIG. 8) and side view, respectively, according to one embodiment of the present invention.
Figure 8:
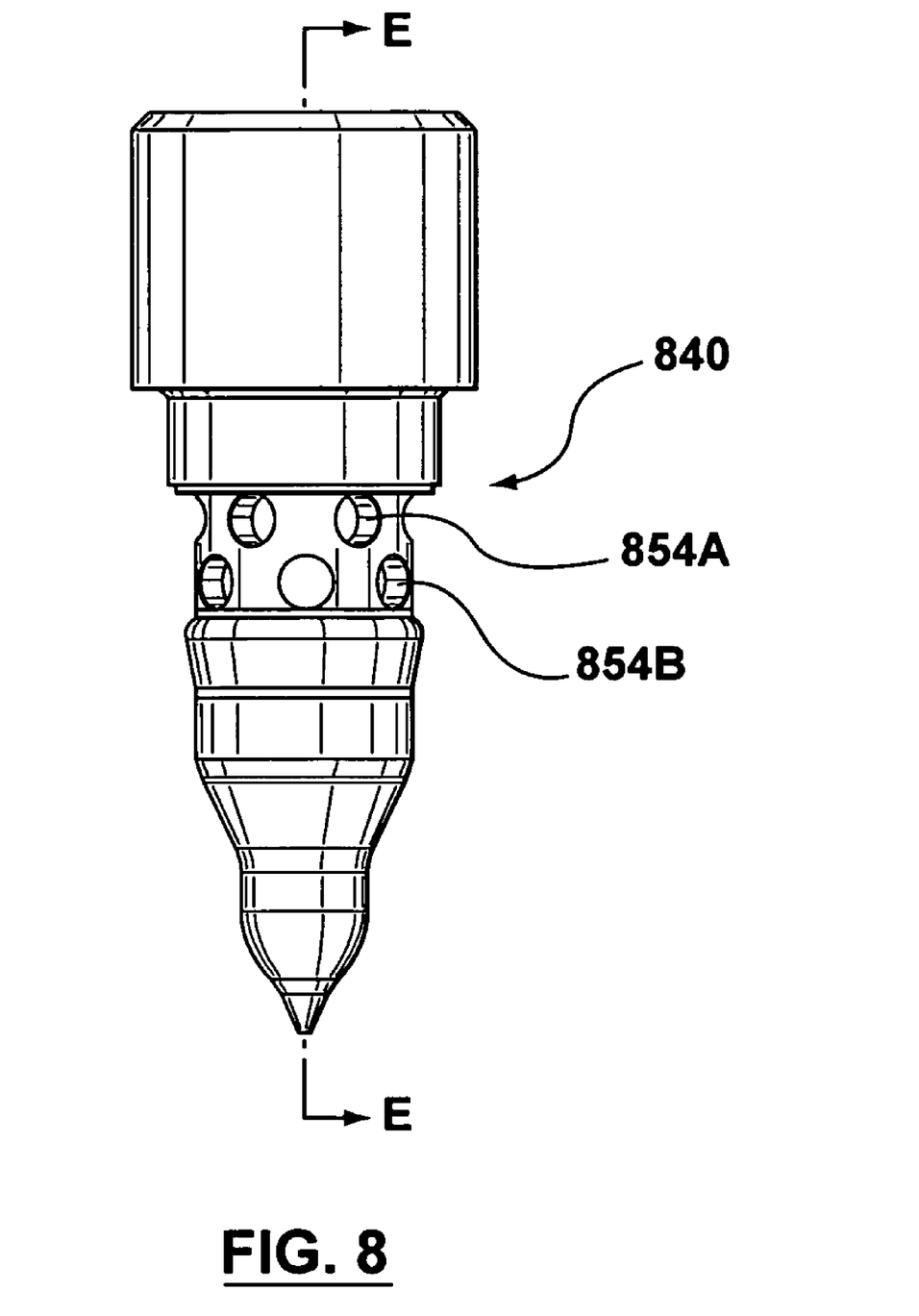

FIGS. 7 and 8 show a cross-sectional view (taken along line E-E in FIG. 8) and side view, respectively, of a nozzle tip 740/840 according to one embodiment of the present invention. Nozzle tip 740/840 has a plurality of release melt channels 754A/854A on a first level and a second plurality of release melt channels 754B/854B on a second level downstream from a first level. In one example, release melt channels 754A/854A are offset with respect to release melt channels 754B/854B. This can be done, for example, to provide an intercrossing melt flow. This allows for, for example, a substantial reduction weld/split lines as compared to only a single release melt channel or a single level release melt channel environment. In various examples, a number of release melt channels 754A/854A on the first level can be equal to or a different number that a number of release channels 754B/854B on the second level.

FIG. 7 includes all elements described above for FIGS. 2 and 4, with the alternative nozzle tip 740, as described above for FIG. 7. In the example shown in FIG. 7, release melt channels 754A and 754B exit from first melt channel 752 into first portion 758 of annular melt channel 756.

FIG. 5 shows a cross-sectional view of nozzle 304 of FIG. 3 taken along line D-D in FIG. 3, according to an embodiment of the present invention. In this embodiment, three release melt channels 354 are used to carry melt from nozzle tip 340 to annular melt channel 356 (which may have decompression in portion 358). A specific number of release melt channels 354 is application specific, as are the parameters (sizes) of release melt channels 354, decompression chamber 358, and compression chamber 360.

Exemplary Annular Melt Channel Dimensions

Figure 6:
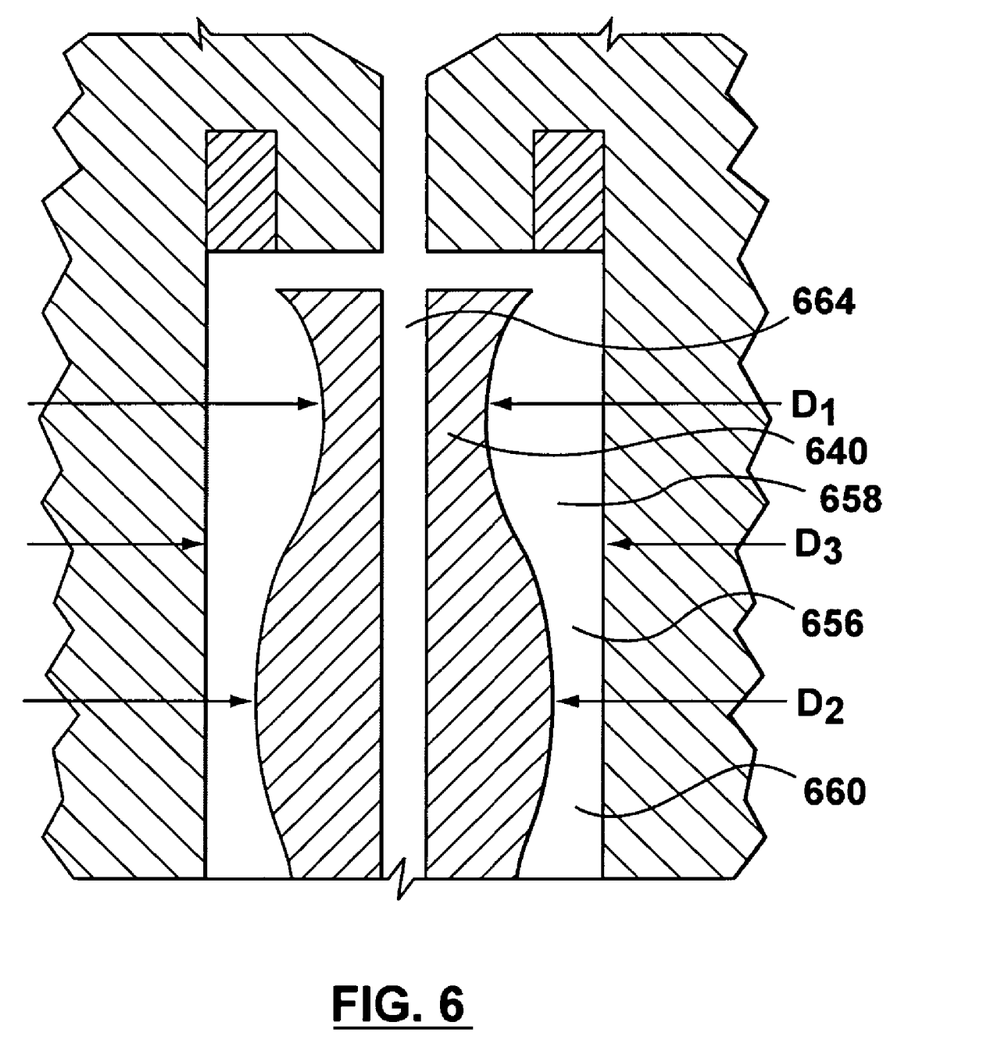
FIG. 6 is a side sectional view of a portion of a nozzle for use in the machine of FIG. 1, according to an embodiment of the present invention.

FIG. 6 is a side sectional view of a portion of a nozzle for use in the machine of FIG. 1, according to an embodiment of the present invention. In this embodiment, an annular melt channel 656 is defined between a nozzle tip 640 and a retaining device 642. Annular melt channel 656 includes a first inner diameter D1 formed in a first portion 658 of annular melt channel 656 and a second inner diameter D2 formed in a second portion 660 of annular melt channel 656. In this example, D1 is smaller than D2. This figure also shows an outer diameter D3 of annular melt channel 656.

In one example, the retaining device has a substantially constant inner diameter. The annular channel includes a first portion and a second portion. The first portion of the annular channel has a first inner diameter and is in fluid communication with the nozzle tip second melt channel. The second portion of the annular channel has a second inner diameter and is in fluid communication with the first portion of the annular channel and with a mold cavity. The second inner diameter is larger than the first inner diameter.

CONCLUSION

While various embodiments of the present invention have been described above, it should be understood that they have been presented by way of example only, and not limitation.

It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A nozzle for an injection molding apparatus, comprising:
   a nozzle body having a nozzle melt channel with a nozzle axis;
   a nozzle tip, including,
      a first melt channel in fluid communication with the nozzle melt channel, the first melt channel having a first melt channel axis, and
      a second melt channel in fluid communication with the first melt channel and having a second melt channel axis that is at an angle with respect to the first melt channel axis;
   a retaining device that positions the nozzle tip with respect to the nozzle body;
   an annular melt channel formed between the nozzle tip and the retaining device; and
   a valve gating element that moves along the longitudinal axes of the nozzle body and in the first melt channel to selectively open a mold gate.

2. The nozzle of claim 1, wherein there are two or more of the nozzle tip second melt channels.

3. The nozzle of claim 1, wherein there are between three and six of the nozzle tip second melt channels.

4. The nozzle of claim 1, wherein a first portion of the annular melt channel comprises a decompression chamber.

5. The nozzle of claim 4, wherein a second portion of the annular melt channel comprises a melt compression chamber.

6. The nozzle of claim 5, wherein the second portion of the annular melt channel comprises a compression chamber adjacent the decompression chamber.

7. The nozzle of claim 1, wherein an area between the nozzle tip and a mold gate is devoid of a bubble area.

8. The nozzle of claim 1, wherein the nozzle tip is made from a material that is more thermally conductive then said retaining device.

9. The nozzle of claim 8, wherein the nozzle tip comprises one of a copper alloy or a steel.

10. The nozzle of claim 8, wherein the retaining device is made from at least one of steel, titanium alloy, and ceramic.

11. The nozzle of claim 1, wherein the retaining device comprises:
    a retaining portion that positions the nozzle tip with respect to the nozzle body; and
    a sealing portion that insulates the nozzle tip from a mold plate.

12. The nozzle of claim 11, wherein the sealing portion touches the mold plate.

13. The nozzle of claim 1, wherein the second melt channel axis is substantially normal with respect to the first melt channel axis.

14. The nozzle of claim 1, wherein the annular melt channel comprises:
   a first portion having a first diameter and being in fluid communication with the nozzle tip second melt channel, and
   a second portion having a second diameter and being in fluid communication with the first portion of the annular melt channel and with a mold cavity, wherein the second diameter is smaller than the first diameter.

15. The nozzle of claim 1, wherein the nozzle tip frirther comprises:
   a valve pin alignment bore that continuously guides the valve gating element.

16. The nozzle of claim 15, wherein the valve gating element substantially prevents the melt from exiting the first melt channel into the valve pin alignment bore.

17. The nozzle of claim 15, wherein the inside surface of the valve pin alignment bore comprises a wear resistant coating.

18. A nozzle in an injection molding apparatus, comprising:
   a nozzle body having a nozzle melt channel, the nozzle melt channel having a longitudinal axis;
   a nozzle seal, including,
      a first piece that is a nozzle tip;
      a second piece that is a sealing device, such that the sealing device insulates the nozzle from a mold cavity;
   an annular melt channel formed between the first and second pieces, such that melt flows through the annular melt channel before entering the mold cavity;
   an exit channel having a longitudinal axis that is normal with respect to the longitudinal axis of the first piece and that extends between the first piece and the annular melt channel;
   a decompression chamber in fluid communication with the exit channel;
   a compression chamber in fluid communication with the decompression chamber; and
   a valve gating element that moves along the longitudinal axes of the nozzle body and the second piece to selectively open a gate.

19. The nozzle of claim 18, wherein the first piece includes a first melt channel having a longitudinal axis and a valve pin alignment bore.

20. The nozzle of claim 19, wherein the valve gating element prevents the melt from exiting the second piece.

21. A nozzle for an injection molding apparatus, comprising:
   a nozzle body and nozzle tip defining a nozzle melt channel having a longitudinal axis, the nozzle tip defining a release melt channel extending from the nozzle melt channel at an angle to the longitudinal axis;
   an annular wall secured to the nozzle body and extending around at least a portion of the nozzle tip, the annular wall and nozzle tip defining therebetween an annular melt channel for transmitting melt flow from the release melt channel towards a mold gate, the annular melt channel including a first annular portion in flow communication with the release melt channel and a second annular portion downstream from the first annular portion, the first and second annular portions being respectfully dimensioned such that the first annular portion forms a decompression chamber for melt flowing therethrough and the second annular portion forms a compression chamber for melt flowing therethrough; and
   a valve gating element that moves along the longitudinal axis in the nozzle melt channel to selectively open a mold gate.

22. The nozzle of claim 21 wherein the release melt channel has a radially directed discharge opening in a circumferential outer surface of the nozzle tip, and the first annular portion of the annular melt channel extends circumferentially around the nozzle tip such that the release melt channel discharges melt flow radially into the first annular portion relative to the longitudinal axis.

23. The nozzle of claim 22 wherein the release melt channel extends substantially normal to the longitudinal axis.

24. The nozzle of claim 23 wherein the nozzle tip defines a further release melt channel transmitting melt flow from the nozzle melt channel to the first annular portion, the release melt channel and the further release melt channel having discharge openings longitudinally offset from each other relative to the longitudinal axis.

25. The nozzle of claim 23 wherein the nozzle tip defines a plurality of the release melt channels for transmitting melt flow from the nozzle melt channel to the first annular portion of the annular melt channel, at least some of the release melt channels having discharge openings into the first annular portion at locations downstream from discharge openings of others of the release melt channels.

26. The nozzle of claim 25 wherein a cross-sectional flow area of the first annular portion is greater than that of the second annular portion.

27. The nozzle of claim 26 wherein an outer surface portion of the nozzle tip that defines an inner boundary of the first annular portion has a diameter that is less than a diameter of an outer surface portion of the nozzle tip that defines an inner boundary of the second annular portion.

28. The nozzle of claim 27 wherein the annular wall comprises a sealing device that seals the nozzle tip with respect to a mold cavity.

29. The nozzle of claim 28 wherein the sealing device insulates the nozzle tip from a mold plate.

30. The nozzle of claim 21 wherein the nozzle tip comprises a first section made from a thermally conductive material and a second section made from a wear resistant material.

31. A nozzle for an injection molding apparatus, comprising:
   a nozzle body having a nozzle melt channel with a longitudinal axis;
   a nozzle tip, including, a first melt channel in fluid communication with the nozzle melt channel, the first melt channel having a first melt channel longitudinal axis, and a second melt channel in fluid communication with the first melt channel and having a second melt channel longitudinal axis that is substantially normal with respect to the first melt channel longitudinal axis;
   an annular wall extending around the nozzle tip;
   an annular melt channel formed between the nozzle tip and the annular wall;
   a valve gating element that moves along the longitudinal axis of the nozzle body and in the first melt channel to selectively open a mold gate; and
   where said annular melt channel includes a first and second portion where said first portion is a decompression chamber and said second portion is a compression chamber and said compression chamber is adjacent the decompression chamber.

32. The nozzle of claim 31 wherein the annular wall is a retaining device that positions the nozzle tip with respect to the nozzle body.

33. The nozzle of claim 31 wherein the annular wall is a sealing device that seals the nozzle tip with respect to a mold cavity.

34. The nozzle of claim 31, wherein there are between three and six of the nozzle tip second melt channels.

35. The nozzle of claim 33, wherein the sealing device touches a mold plate.

36. The nozzle of claim 18 wherein said sealing device further comprises a retaining portion, and said retaining portion retains said nozzle tip with respect to the nozzle body.

37. The nozzle of claim 19 wherein said valve gating element moves along said channel of the first piece to selectively open and close said gate.

38. The nozzle of claim 36, wherein the sealing device touches a mold cavity plate.

39. The nozzle of claim 28 wherein the annular wall comprises a retaining device that positions the nozzle tip with respect to the nozzle body.

\* \* \* \* \*